United States Patent
Aksay et al.

(10) Patent No.: US 10,920,334 B2
(45) Date of Patent: Feb. 16, 2021

(54) ELECTROHYDRODYNAMICALLY FORMED STRUCTURES OF CARBONACEOUS MATERIAL

(71) Applicant: The Trustees of Princeton University, Princeton, NJ (US)

(72) Inventors: Ilhan A. Aksay, Princeton, NJ (US); Valerie Alain-Rizzo, Princeton Junction, NJ (US); Michael Bozlar, Princeton, NJ (US); David J. Bozym, Princeton, NJ (US); Daniel M. Dabbs, Princeton, NJ (US); Nicholas Szamreta, Parlin, NJ (US); Cem B. Ustundag, Plainsboro, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 213 days.

(21) Appl. No.: 16/086,882

(22) PCT Filed: Mar. 21, 2017

(86) PCT No.: PCT/US2017/023396
§ 371 (c)(1),
(2) Date: Sep. 20, 2018

(87) PCT Pub. No.: WO2017/165407
PCT Pub. Date: Sep. 28, 2017

(65) Prior Publication Data
US 2019/0100852 A1    Apr. 4, 2019

Related U.S. Application Data

(60) Provisional application No. 62/311,477, filed on Mar. 22, 2016.

(51) Int. Cl.
*C25D 13/02* (2006.01)
*B41J 2/075* (2006.01)
(Continued)

(52) U.S. Cl.
CPC .............. *C25D 13/02* (2013.01); *B41J 2/075* (2013.01); *B41J 2/095* (2013.01); *C25D 13/22* (2013.01);
(Continued)

(58) Field of Classification Search
CPC ........ C25D 13/02; C25D 13/22; C25D 15/02; C25D 7/00; C25D 13/12; C25D 13/18;
(Continued)

(56) References Cited

U.S. PATENT DOCUMENTS 2,894,888 A    7/1959 Shyne et al.
3,932,231 A    1/1976 Hara et al.
(Continued)

FOREIGN PATENT DOCUMENTS

| WO | 9119023 A1 | 12/1991 |
|---|---|---|
| WO | WO02013/123339 | * 8/2013 |
| WO | 20150170783 A1 | 11/2015 |

OTHER PUBLICATIONS

International Search Report and Written Opinion for PCT/US2017/023396, dated Jun. 6, 2017.

*Primary Examiner* — Xiuyu Tai
(74) *Attorney, Agent, or Firm* — Meagher Emanuel Laks Foldberg & Liao, LLP.

(57) ABSTRACT

A method for the electrohydrodynamic deposition of carbonaceous materials utilizing an electrohydrodynamic cell comprising two electrodes comprised of a conductive material, by first combining a solid phase comprising a carbonaceous material and a suspension medium, placing the suspension between the electrodes, applying an electric field in a first direction, varying the intensity of the electric field sufficiently to drive lateral movement, increasing the electrical field to stop the lateral transport and fix the layers in place, then removing the applied field and removing the
(Continued)

electrodes. Among the many different possibilities contemplated, the method may advantageously utilize: varying the spacing between the electrodes; removing the buildup from one or both electrodes; placing the electrodes into different suspensions; adjusting the concentration, pH, or temperature of the suspension(s); and varying the direction, intensity or duration of the electric fields.

27 Claims, 13 Drawing Sheets

(51) Int. Cl.
    *B41J 2/095* (2006.01)
    *C25D 15/02* (2006.01)
    *C25D 13/22* (2006.01)
    *C01B 32/194* (2017.01)
    *C01B 32/192* (2017.01)
    *C25D 7/00* (2006.01)

(52) U.S. Cl.
    CPC ............ C25D 15/02 (2013.01); *C01B 32/192* (2017.08); *C01B 32/194* (2017.08); *C01B 2204/22* (2013.01); *C25D 7/00* (2013.01)

(58) Field of Classification Search
    CPC ........... C25D 13/16; B41J 2/075; B41J 2/095; C01B 32/194; C01B 32/192; C01B 2204/22; C01B 32/184; C01B 2204/04; C01B 2204/02; C01B 2204/32; H01G 11/44; H01G 11/34; H01G 11/86; H01G 11/36; H01G 11/38; H01G 11/24; H01G 11/28; H01G 11/04; C09D 11/037; C09D 11/52; C09D 11/033; C09D 5/24; H01M 4/587; H01M 4/133; H01M 4/364; B82Y 40/00; B82Y 30/00; B82Y 10/00; B82Y 20/00; G01N 27/308; Y10S 977/892; Y10S 977/842; Y10S 977/932; Y10S 977/734; Y02E 60/13; Y02E 60/10; C08L 25/06; B82B 3/0066; H01L 29/0673; H01L 29/66439

See application file for complete search history.

(56) References Cited

U.S. PATENT DOCUMENTS

| | | |
|---|---|---|
| 4,612,104 A | 9/1986 | Holmes et al. |
| 4,800,009 A | 1/1989 | Despic et al. |
| 5,855,753 A | 1/1999 | Trau et al. |
| 6,033,547 A | 3/2000 | Trau et al. |
| 6,533,903 B2 | 3/2003 | Hayward et al. |
| 7,261,915 B2 | 8/2007 | Boulais et al. |
| 7,658,901 B2 | 2/2010 | Prud'Homme et al. |
| 2002/0038764 A1 | 4/2002 | Taylor et al. |
| 2003/0161959 A1 | 8/2003 | Kodas et al. |
| 2006/0243597 A1 | 11/2006 | Matefi-Tempfli et al. |
| 2011/0168558 A1 | 7/2011 | Fransaer et al. |
| 2012/0064290 A1 | 3/2012 | Esat et al. |
| 2015/0287543 A1* | 10/2015 | Aksay ..................... C09D 5/24 361/502 |

* cited by examiner

ELECTROHYDRODYNAMICALLY FORMED STRUCTURES OF CARBONACEOUS MATERIAL

CROSS-REFERENCE TO RELATED APPLICATIONS

This application claims priority to U.S. Provisional Application No. 62/311,477, filed Mar. 22, 2016, which is herein incorporated by reference in its entirety.

STATEMENT REGARDING FEDERALLY SPONSORED RESEARCH OR DEVELOPMENT

This invention was made with government support under Grant No. DE-AR000319 awarded by the Department of Energy, Advanced Research Projects Agency-Energy (ARPA-E). The government has certain rights in the invention.

BACKGROUND OF THE INVENTION

The present invention relates generally to carbon structures and specifically to electrohydrodynamically formed structures of carbonaceous material. Coatings, such as physically coherent films, coatings, membranes, or tapes made from high carbon content materials, such as graphene sheets, can be assembled using electrophoretic deposition, tape casting, spin casting, drop casting, or filtration. Cast or filtered structures typically have to be at least 400 nm thick to provide continuity and mechanical stability. Such structures contain flaws created by removing the liquid through drying or filtration. In addition, such structures can have a reduced flexibility and compliance, which can result in an increase in susceptibility to damage during transfer and/or fitting to the item to be covered. Similar to electrohydrodynamic deposition, electrophoretic deposition uses an applied electric field to attract particles or sheets to a surface having an overall charge opposite to the charge intrinsic to or induced on the particles or sheets, thereby coating the surface, as described in U.S. Pat. No. 2,894,888 to Shyne, et al., and U.S. Pat. No. 3,932,231 to Hara, et al., and many others. However, in electrophoretic deposition the particles or sheets adhere at the point of initial contact to the substrate or previously deposited layers and remain fixed in position, which leaves defects or gaps between the particles or sheets comprising the layers that constitute the coating, membrane, or film. A fully dense covering requires several layers, resulting in increased thickness of the coating, membrane, or film which limits its applications.

BRIEF SUMMARY OF THE INVENTION

The present invention is directed to a method for depositing carbonaceous materials utilizing an electrohydrodynamic cell. In the present invention methods are provided in which carbonaceous materials in a suspension medium are deposited on electrodes by applying an electric field having a first direction, varying the intensity to drive lateral movement, building up layers, fixing the layers in place, then reducing the field and removing the electrodes. The method of claim 1, wherein at least one of the electrodes further comprises a substrate in contact with or electrical communication with the outer surface of the conductive material.

Among the many different possibilities contemplated, the method may advantageously utilize electrodes positioned either parallel or perpendicular to a base surface of the electrohydrodynamic cell. It is further contemplated that the method may also vary the spacing between the electrodes, the temperature, pH, or concentration of the suspension, or the duration or intensity of the applied field. The method may be utilized to create graded structures, or to deposit at least one carbonaceous material and at least one other material. It is further contemplated that the method may also involve reversing the field direction to allow deposition of materials having an overall charge opposite that of the carbonaceous materials, and this process of reversing the field may be repeated. It is also contemplated that one or more of the coated electrodes may be removed from the electrohydrodynamic cell and placed into a different electrohydrodynamic cell containing a suspension comprising a different carbonaceous material, and utilizing a similar process, which may be repeated if desired. It is contemplated that the method may also utilize a suspension of a non-carbonaceous material that can be deposited onto previously deposited coatings via electrophoretic or electrohydrodynamic deposition. It is also contemplated that at least one of the coated electrodes is covered by a material prior to electrohydrodynamic deposition, the material being selected so as to be impermeable to atoms, molecules, ions, oligomers, and polymers; or to have an intrinsic porosity in which the average channel diameter, accessibility, tortuosity, and length is selected to facilitate the passage of targeted agents such as atoms, molecules, ions, oligomers, and polymers. It is still further contemplated that the method may involve removing the layered structure from at least one of the electrodes, and that the electrodes may be dense or have an intrinsic porosity such that it may be completely or partially filled by the suspended materials in order to create a dense or a porous coating on the at least one of the anode or cathode. It is contemplated that the removed structure may be dried or exposed to EM radiation, and may also involve the reduction of the carbonaceous materials or intercalation of the layered structure.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "carbonaceous materials" includes any solid material, other than an inorganic carbonate, which is comprised of carbon, including mixtures or compounds comprising carbon. This includes, but is not limited to: graphite, graphite oxide, pristine graphene, graphene oxide, functionalized graphene sheets—whether those sheets are composed of single sheets, multilayered stacks of single sheets, or some other multi-sheet arrangement—graphitic materials, and mixtures of the same.

Figure 1A:
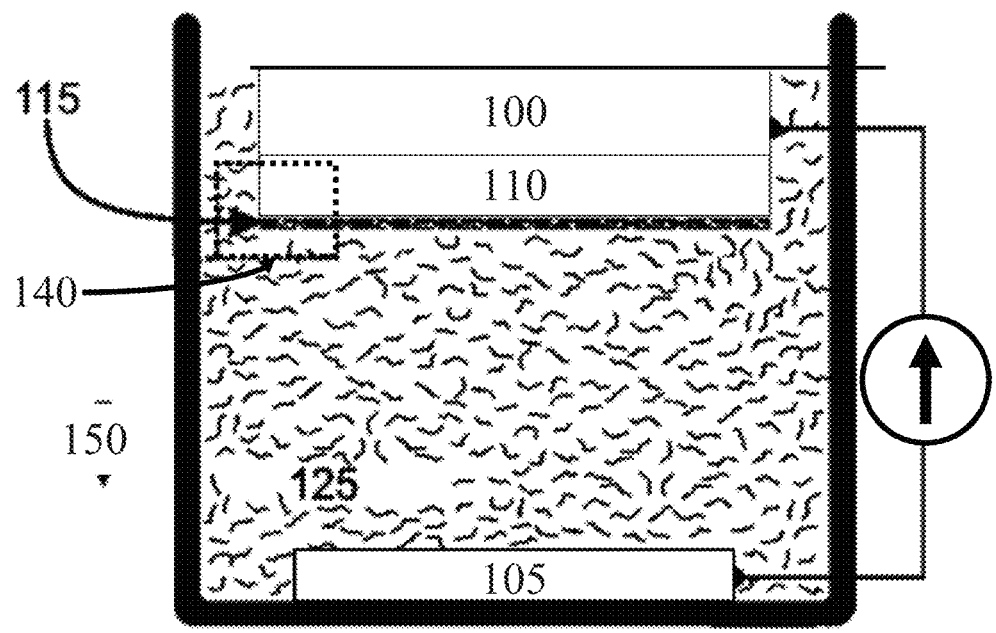
FIGS. 1A, B, and C depict an electrohydrodynamic deposition (EHD) method, in accordance with an embodiment of the present invention.
Figure 1B:
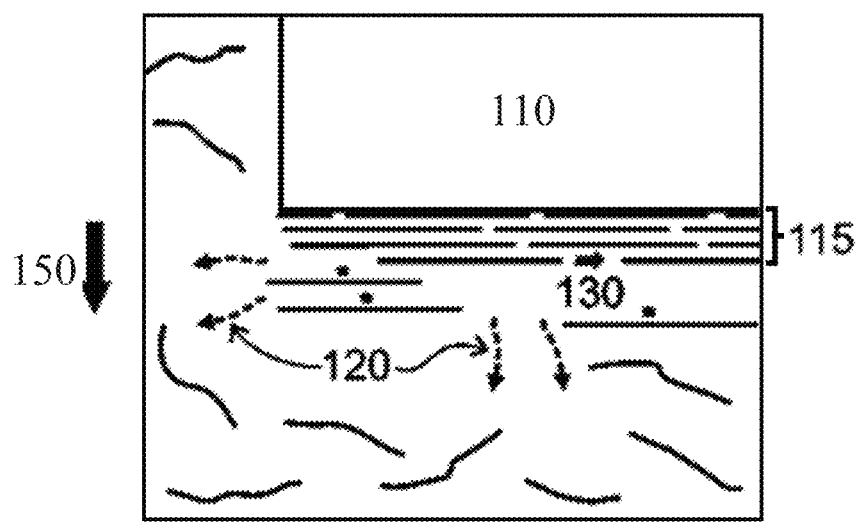

Coatings, such as physically coherent films, coatings, membranes, or tapes made from high carbon content materials, such as graphene sheets, can be assembled using electrophoretic deposition, drop casting, spin casting, tape casting, or filtration. Such structures typically have to be at least 400 nm thick to provide continuity and mechanical stability. Such structures contain flaws created by removing the liquid through drying or filtration. In addition, such structures can have a reduced flexibility and/or compliance, which can result in an increase in susceptibility to damage during transfer and/or fitting to the item to be covered. Electrophoretic deposition ("EPD") as described in U.S. Pat. No. 2,894,888 to Shyne, et al., and U.S. Pat. No. 3,932,231 to Elara, et al., and many others, brings particles or sheets to the surface under an applied field but these adhere to the surface upon contact and cannot move from the original point of contact. Embodiments of the present invention seek to provide coatings that are formed using electrohydrodynamic deposition ("EHD"), in which mutually repulsive sheets or particles rearrange after deposition to eliminate defects and from which liquid is excluded during the layering process (FIGS. 1A and 1B). Other aspects of the present invention seek to provide a method of forming electrohydrodynamically deposited coatings.

FIGS. 1A, B, and C depict an EHD method, in accordance with an embodiment of the present invention. FIG. 1A illustrates a horizontal EHD method, which includes electrodes 100 and 105 suspended in suspension 125. For a suspension of particles or sheets bearing an overall negative charge and under a field applied in the direction (150) shown, electrodes 100 and 105 represent a cathode and anode, respectively. The standard definition for the direction of an electric field is that direction in which a positively charged object will move under the influence of the field. Thus, negatively charged materials will deposit on the anode and positively charged materials will deposit on the cathode. The direction of field can be reversed by reversing the charges on the electrodes 100 and 105, for example, or by applying an alternating current ("AC") instead of the direct current ("DC") shown in FIG. 1A. Despite the charged states of the electrodes, substrate 110 can be positioned in contact with or electrical communication with electrode 100. When present, substrate 110 can be an electrically conductive (such as a metal), semiconducting (such as silicon), or insulating material (such as a metal oxide ceramic); in addition, substrate 110 may be fully dense or porous (further description below). Substrate 110 can include flexible or rigid films, composed of hydrocarbon polymers. To initiate the EHD process of the current invention ("the EHD process"), an electrical field is applied between electrodes 100 and 105 to initiate the formation of coating 115. In the case of electrically insulating materials, the applied voltage is set below the breakdown voltage of the material.

In certain embodiments, substrate 110 is not present and coating 115 is formed directly on electrode 100. Substrate 110 can be a thin porous insulating membrane, wherein the formation of coating 115 thereon creates a carbonaceous film on a porous insulating film. Where the carbonaceous material is graphene oxide, substrate 110 can serve as a compliant, insulating substrate for coating 115. Where the carbonaceous material is a conductive material, for example, reduced graphene oxide or graphene, the process creates an electronically asymmetric composite consisting of an insulator on one side and a conductor on the other.

Coating 115 can comprise one or more layers of individual sheets of carbonaceous material. The carbonaceous material can have a sheet- or plate-like structure. Applicable carbonaceous materials include, but are not limited to, graphene sheets, graphite, graphite oxide, and carbon precursors formed through vapor deposition. Suspension 125 comprises carbonaceous material suspended in a liquid. To facilitate coatings preparation, suspension 125 can be prepared using any suitable method for agitating, including but not limited to, ultrasonication, stirring, milling, and shear mixing, with or without additional heating and/or cooling.

Variations of the liquid's pH can facilitate coating formation depending on the nature of the carbonaceous material used.

Figure 1C:
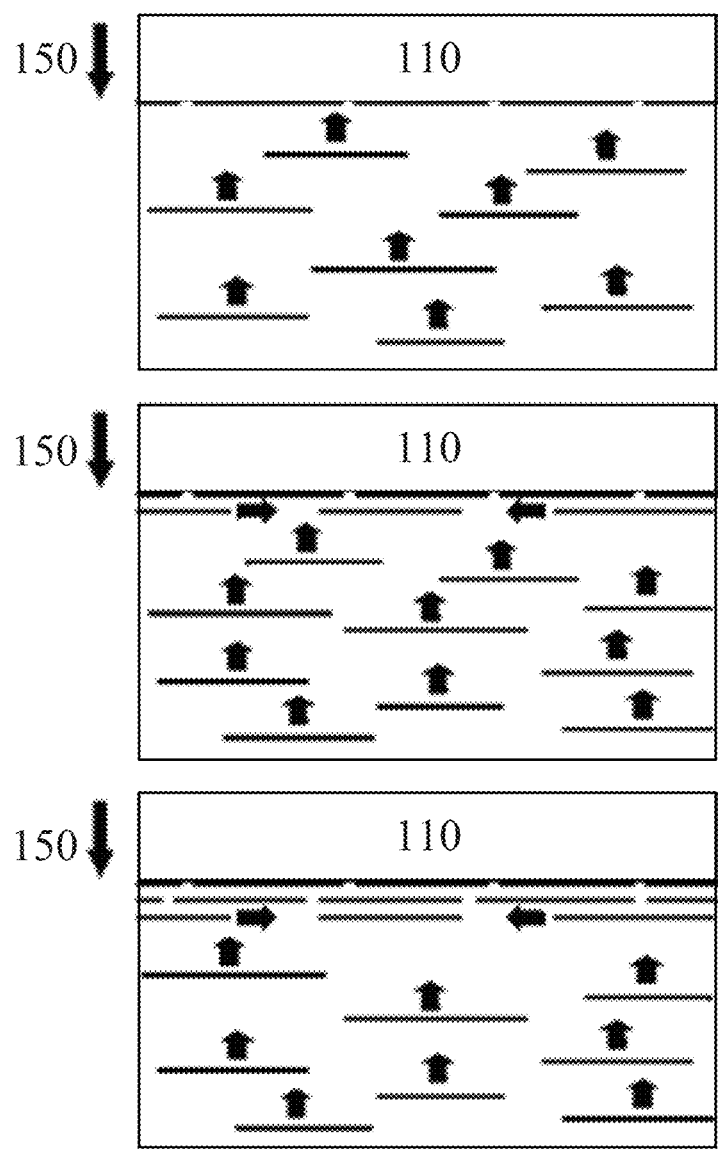

FIG. 1B is a magnification of a region (140) in FIG. 1A to illustrate how the EHD process is initiated by the attraction of particles and/or molecular sheets of carbonaceous material toward the deposition surface when the particles are distant from the substrate surface, converting to EHD in close proximity of substrate 110 (when present) or electrode 100, where the particles or sheets are repelled by the surface and/or each other. In the EHD process, the well-dispersed particles or sheets in suspension 125 are mutually repulsive, thereby remaining dispersed in the liquid as a stable suspension and deposit on the substrate 110 only under the application of a field of sufficient intensity. The initial deposition has the particles or sheets maintaining separation, but under the influence of electrohydrodynamic forces, as described in U.S. Pat. No. 6,033,547 to Trau et al. and U.S. Pat. No. 5,855,753 again to Trau et. al., the particles or sheets are forced closer together via lateral transport 130 on the surface (FIG. 1B). The result is a closely packed layer of particles or sheets onto which a subsequent layer is deposited through the same EHD process (FIG. 1C). EHD is essential to the success of the present invention as it is desirable to reduce and/or inhibit the immediate adherence of the carbonaceous material to itself and/or to the substrate surface but instead it is desirable to promote the lateral movement 130 of the carbonaceous material in near proximity of the substrate (110) to produce fully dense, well stacked, and staggered layers in which potential gaps and defects have been filled through transport 130 (FIG. 1A).

Stiction, or adherence between layers, can then be induced by overcoming the repulsion, for instance, with an interim potential pulse of sufficient intensity to adhere one layer to another. Whereas in the typical EPD process the particles or sheets stick to the surface upon first contact and cannot move following this initial contact.

The EHD process is a rapid process that can be used either in batch or continuous operation. In some applications, coating 115 can be deposited directly to the surface of a device or structure (such as a surface). In others, coating 115 can be formed separately and then applied and/or fitted to the device or structure. The structure may be electronically conductive, semiconducting, or insulating, providing a generic method for coating any surface of interest. Coating 115 can be a flexible, thin, and free-standing membrane that can be applied to surfaces with complex shapes or patterning.

Coating 115 can have a thickness of 100 nm or less. FIG. 1B illustrates that coating 115 can be formed into multi-layered structures having a highly connected and/or contiguous microstructure with well-defined spacing between the layers. In this embodiment, coating 115 can be formed by applying the electric field for about 3 seconds to about 30 minutes. Electrode 100 or substrate 110 may include, but are not limited to, any metal suitable for use as a current collector in batteries, for example lithium ion batteries, such as gold, nickel, and/or stainless steel.

Coating 115 can be thermally stable, electrochemically stable, resistant to abrasion, and/or chemically inert, except, in the latter case, to the loss of oxygen (e.g., reduction) from oxygen-containing materials. The oxygen content of the carbonaceous material can be adjusted, which can allow the electrical conductivity of coating 115 to be adjusted by thermal, radiative, electrochemical, and/or chemical reduction of the carbonaceous material, either before being suspended, while in suspension, or after aggregation (discussed further below).

As the electric field is applied to electrodes 100 and 105, sheets of carbonaceous material are layered and the liquid of suspension 125 can be excluded from between the layers in the direction opposite to the deposition direction of the carbonaceous material during the formation of coating 115 (dashed arrows 120, FIG. 1B). Liquid is also excluded as the sheets or particles move together during lateral translation 130 caused by the electrohydrodynamic forces (FIG. 1B). The exclusion of liquid during deposition reduces the amount of entrained liquid within coating 115 (FIG. 1C), which eliminates or reduces the need to dry coating 115 before use. The exclusion of the liquid combined with the electrohydrodynamic translation typically allows coating 115 to be a homogeneous structure without filtration channels or other defects as the lateral movement 130 acts to repair or fill such defects. These defects can be inherent in the filtration processes of previously described EHD processes such as U.S. Pat. No. 6,533,903 to Hayward et al., U.S. Pat. No. 6,033,547 to Trau et al. and U.S. Pat. No. 5,855,753 again to Trau et al. Coating 115 can be formed in a manner to comprise designed patterns by, for example, inducing current density variations on the surface of substrate 110 (when present) or electrode 100. The thickness of coating 115 can be controlled by modifying the intensity and/or duration of the applied electrical field. The conditions under which the EHD process can be performed, such as temperature, suspension concentration and the type of carbonaceous sheet in suspension, may be varied to control the areal density of connected sheets within separate layers (thereby determining the size, number and distribution of gaps within the layer). Coating 115 can be formed in a manner to be compliant and exhibit an improved resistance to damage during subsequent application and processing.

The carbonaceous material can be prepared from a variety of graphene sources including but not limited to graphite, graphite oxide or oxidized graphite, and/or carbon precursors formed via vapor deposition. The carbonaceous material can be dispersed in an appropriate liquid prior to coating production. Examples of liquids used as a suspension medium can include, but are not limited to, water, ammoniated water, liquid hydrocarbons, alcohols (such as ethanol), water/alcohol mixtures (such as ethanol/water), esters and carbonates (such as ethylene carbonate, propylene carbonate), dimethylformamide (DMF), N-methyl-2-pyrrolidone (NMP), acetonitrile, dimethylsulfoxide (DMSO), and ionic liquids. Appropriate liquids can also include melts of organic compounds such as waxes, fatty acids, and ionic liquids with melting points above room temperature. Ionic, non-ionic and/or polymer surfactants can be added to suspension 125 to facilitate processing.

Suspension 125 can be used as made, concentrated, purified, and/or treated with additives. Undesirable large aggregates that may form in suspension 125 can sediment out of suspension, requiring no special apparatus or filtration to be removed before, during or after coating 115 formation. The carbonaceous material can be modified to improve the dispersion in different liquids and to control the spacing between layers of coating 115. Other properties of the suspension, including but not limited to the ionic concentration or pH of the liquid, may be modified to control the degree of dispersion and suspension stability, the mobility of the suspended materials and/or the surface potential of the suspended materials. This may be accomplished in a variety of ways, including but not limited to changing the concentration of the dispersed material and/or adding ionic salts, acids, bases, ionic liquid, or other substances having advantageous properties such as bearing a charge. Further, the suspension may include a mixture of the carbonaceous material and other material, such as particles, polymers, ions, clusters, and the like, which allows the construction of composite layered materials. In this manner the permeability of coating 115 can be adjusted to permit the transport of targeted agents across the membrane, while excluding others. An immediate application of a size-exclusion membrane is in the development of sensing devices and arrays. The functional groups that serve to separate the sheets may also be active agents, reacting with, immobilizing, or retarding the transport of specified agents across the membrane.

Coating 115 can be a multilayer structure comprised of stacked and overlapping sheets of carbonaceous material rendered impermeable to liquids and/or vapors. Coating 115 can protect against corrosion, while remaining permeable to smaller moieties, such as ions. The EHD layering of individual sheets of carbonaceous material can create a structure composed of separate layers having edge-to-edge and partially overlapping sheets, reducing if not completely eliminating the number and size of gaps (voids) in the layer. Stacked layers are separated by spaces between the layers, the breadth of which depend on and can be controlled by the extent of oxidation and/or functional groups attached to the sheets of carbonaceous material. The lateral movement of the particles or sheets coupled with the stacking of the layers eliminates any gaps that may exist in each layer, and remaining gaps or open areas in one layer are unlikely to register with those in neighboring layers, above or below, allowing the extent of permeability to be controlled, as described in the previous section. The EHD process requires lateral movement of the deposited sheets or particles which, as noted, ensures that gaps or spaces between the edges of sheets or the surfaces of particles are minimized in each layer.

Coating 115 can be formed in a manner to be selective to ion intercalation and be ionically conductive to ionic species that can intercalate the spaces between the sheet layers. Coating 115 can be an impermeable membrane utilized as a protective coating on lithium metal anodes in lithium ion batteries, in which the carbonaceous material prevents contact between the corrosive electrolyte solution and the lithium metal while permitting the transport of lithium ions, thereby slowing down significantly the formation of a porous lithium layer that can degrade battery performance and/or cycle life. Coating 115 can suppress the growth of dendritic lithium deposits that can lead to shorting and overheating of the battery.

The electrical conductivity of coating 115 can be tailored by modifying the extent of interconnections between, the level of oxidation of, and/or the nature and presence of functional groups on the sheets of carbonaceous material. Such embodiments may be used in applications such as the current collectors or conductive backings in solar cells. The wetting of a carbonaceous surface by polar liquids (e.g., water) can be controlled by the degree of oxidation of the surface and/or the attachment of functional groups to either encourage or reduce wetting. Surfaces can then be rendered lyophobic or -philic depending on the desired characteristic. Coating 115 can be formed in a manner to be partially transparent.

In this manner coating 115 can be used as semitransparent protective coatings and/or radiative barriers (infrared or thermal, ultraviolet) on transparent materials, such as window glass. When rendered electrically conductive, coating 115 can be used, for example, as transparent electrodes for electrochromic windows and infrared reflectors for solar-control or low-emittance windows to improve the thermal efficiency of buildings or vehicles. Combining protection against radiation with electronic conductivity, coating 115 can protect against electronic interference and electromagnetic fields in electronic devices, and so is suitable for use in the electrostatic shielding of sensitive materials, the packaging of circuit boards and other sensitive electronics, or to shield sensitive electronics in, for example, aerospace applications. The thermal conductivity of coating 115 can be utilized as thermal transfer materials for better thermal management of temperature-sensitive devices such as electronic components. Coating 115 can, due to inherent layered structuring, reduce friction between bodies in contact and may be used to modify surfaces to protect against abrasion, friction (adhesion and cohesion), erosion, and/or corrosion.

Figure 2:
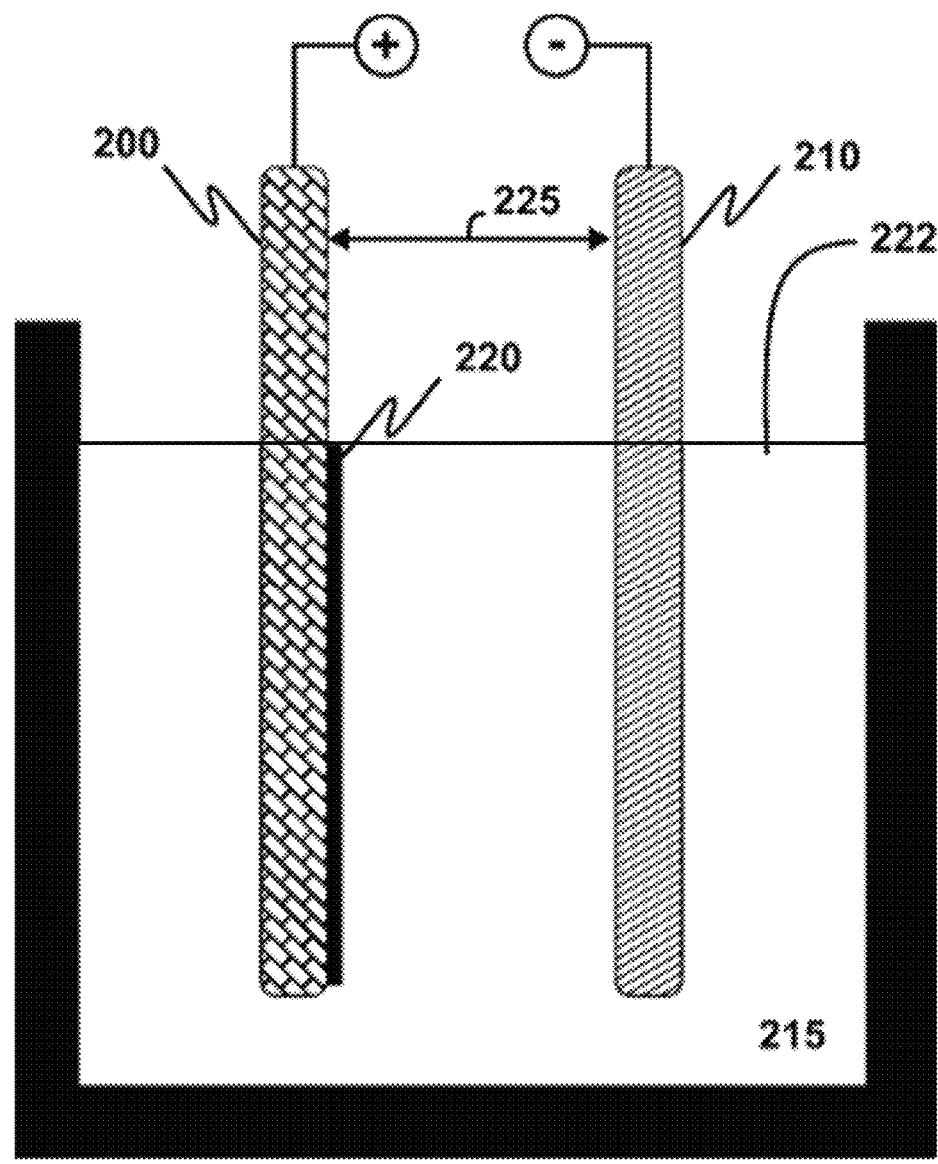
FIG. 2 depicts an alternative setup of the electrohydrodynamic deposition method of FIG. 1, in accordance with an embodiment of the present invention.

FIG. 2 depicts an EHD method, in accordance with an embodiment of the present invention. Specifically, FIG. 2 illustrates an alternative embodiment of the EHD process, wherein electrodes 200 and 210 are vertically oriented. This alternative embodiment utilizes the same components and materials as discussed above; hence, similar elements are comprised of similar materials and perform similar functions as discussed above. Electrodes 200 and 210 can be at least partially submerged in suspension 215, which comprises carbonaceous material 222 suspended in a liquid. Electrodes 200 and 210 can be separated by width 225. An electrical field can be formed between electrodes 200 and 210 to initiate the formation of coating 220 upon the surface of electrode 200, in the case depicted where negative charges are on the carbonaceous material.

Figure 3:
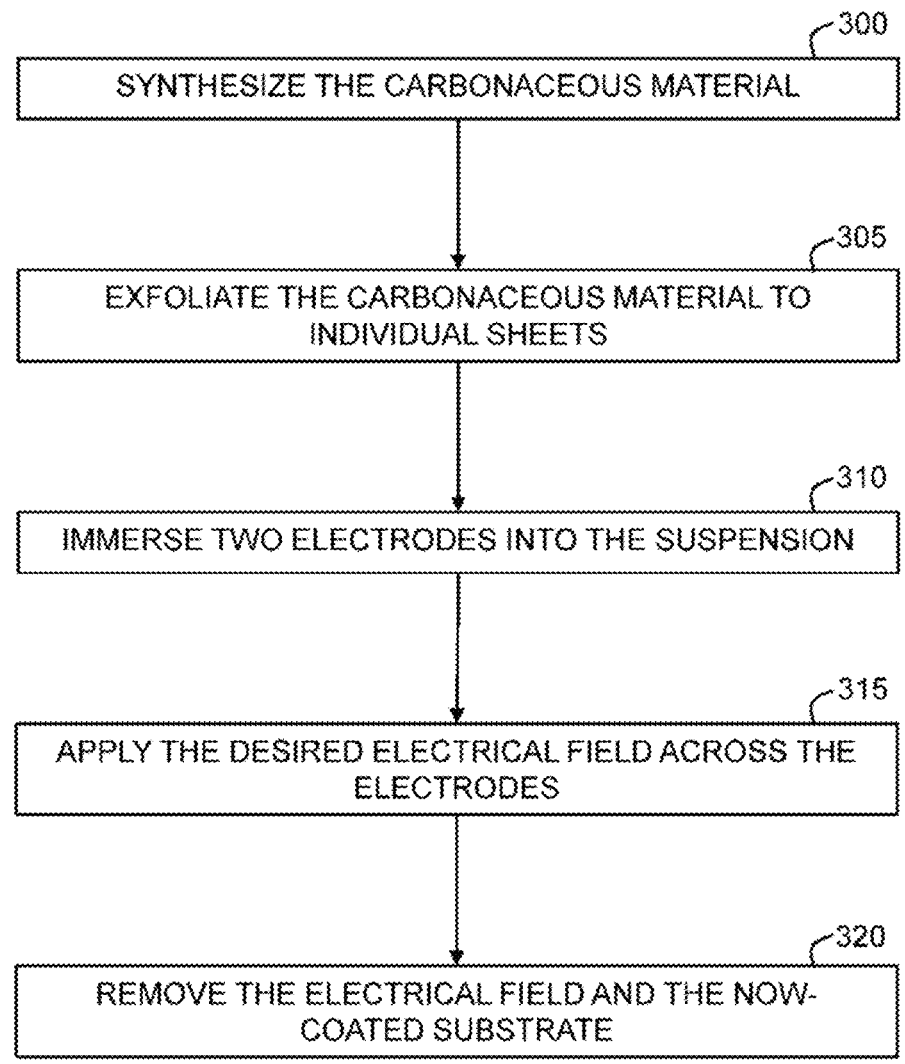
FIG. 3 illustrates the operational steps of an electrohydrodynamic deposition process, in accordance with an embodiment of the present invention.
Figure 4A:
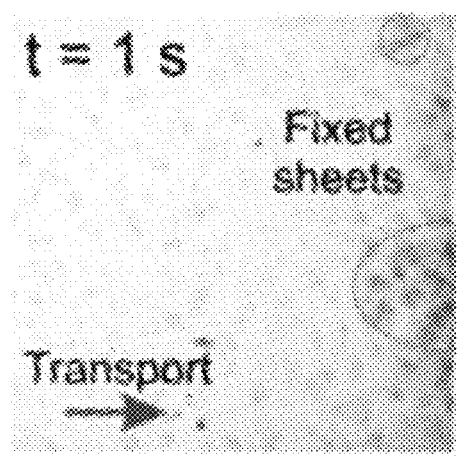
FIGS. 4A, B, C, and D are a time series of optical microscopy images showing the lateral transport of materials (sheets of graphene) under an electric field, in accordance with an embodiment of the present invention.
Figure 4B:
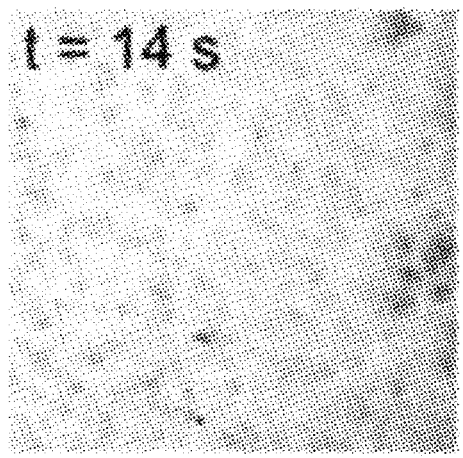
Figure 4C:
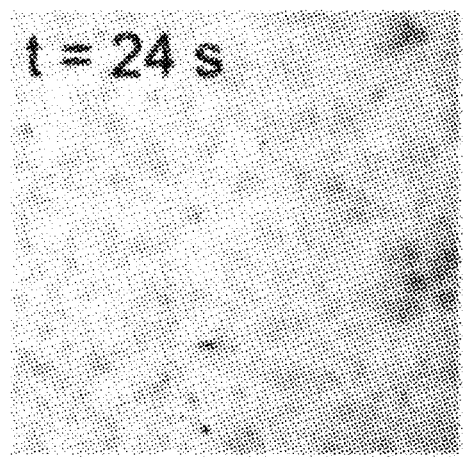
Figure 4D:
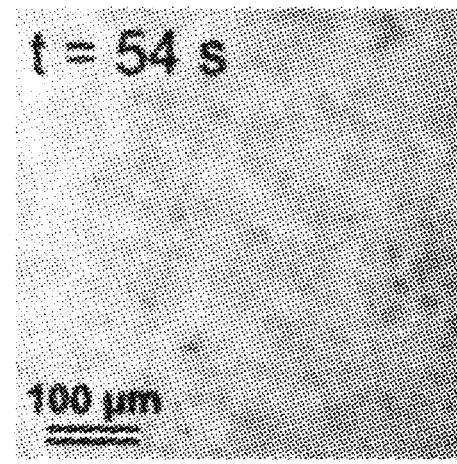

FIG. 3 depicts the operation steps of the EHD process, in accordance with an embodiment of the present invention. Carbonaceous material is synthesized (step 300). For example, graphite oxide can be synthesized by oxidizing graphite powder using an applicable procedure. The carbonaceous material is exfoliated to individual sheets (step 305). For example, the carbonaceous material can be exfoliated to individual sheets using rapid heating, ultrasonication, chemical intercalation or a combination of these methods, and suspended in a polar liquid, including water and aprotic liquids such as tetrahydrofuran, ethyl acetate, acetone, dimethylformamide, acetonitrile or dimethyl sulfoxide. For example, carbonaceous material can be formed as disclosed in U.S. Pat. No. 7,658,901 B2 to Prud'Homme et al.

When appropriate, the carbonaceous material can be reduced or chemically functionalized while in suspension. This can change the stability of the functionalized sheets in the suspending liquid, and may require replacing the original liquid with a more chemically compatible liquid, such as a less polar liquid or changing the suspension pH, to maintain suspension stability and sheet separation. In some applications, it is desirable to work with aggregates composed of layered sheets. In such cases, the suspension pH or polarity can be varied to encourage sheet aggregation whilst in suspension. As noted above, large aggregates can sediment out of suspension.

Thermal exfoliation of the carbonaceous material can reduce the oxygen content. The degree of reduction can be determined by the temperature at which exfoliation is performed and the residence time of the material in the exfoliating chamber. The two electrodes are immersed into the suspension (step 310). For example, the electrodes can have a vertical or horizontal orientation. One or both electrodes may be covered with a substrate, which may be the item to be coated or a sacrificial substrate used to remove the EHD layer from the electrode. Alternatively, the object to be coated can be immersed in the suspension in lieu of one of the electrodes, although this requires that the object have a sufficiently conductive surface to act as an electrode.

Apply the desired electrical field across the electrodes (step 315). For example, in most suspensions, the sheets of carbonaceous material are negatively charged and deposit on the positive electrode. Field intensity can be varied during deposition to change the rate of deposition, create graded structures, and/or overcome the increasing electrical resistance of the coated caused by the increasing thickness of the deposited membrane. The field polarity can be flipped to alternate deposition of the carbonaceous sheets with that of another component to form a bilayer structure. The field intensity can be increased to electrochemically reduce the carbonaceous material in the coating.

Remove the electrical field and the now-coated substrate (step 320). For example, after a desirable interval, the electrical field may be removed and the now-coated electrode, substrate, or object removed from the suspension. In some cases the adhesion of the coating to the surface will be strong enough to withstand washing; otherwise the coating may be removed from the substrate prior to washing and/or subsequent processing to make a free-standing membrane. The coating may then be reduced or subjected to additional processing to render it more suitable for the intended application. Subsequent processing may involve thermal, radiative (including, but not limited to, exposure to ionizing radiation), or chemical processes. This additional processing can be used to modify the layered structure, including but not limiting to changing the nature of the exposed surfaces of the coating, changing the electrical conductivity of the coating, or introducing active agents into the spaces between the layers (intercalation). If fabricated as a free-standing film, the coating can then be applied to a surface. For example, the coating may be layered onto an anode and subsequently assembled into a battery.

As the thickness of the coating increases with deposition, the electrical resistance of the coating may increase, which can require an increase in the intensity of the applied field for continued deposition. However, as field intensity increases, the suspension can be electrolyzed and bubbles formed therein. For example, for certain water-based suspensions an applied voltage above 3-4 V is avoided. Bubbling at the solid/liquid interface may disrupt deposition and damage the existing coating. This limitation can be overcome using suitable organic or ionic liquids as the suspending medium, allowing higher voltages to be applied either for longer time periods to increase thickness or to increase the deposition rate.

Following deposition, the coating may swell when in contact with a liquid that wets the surfaces of the coating, penetrating between the layers of the coating and reducing its effectiveness as a filter, separator, and/or barrier. This may be countered by reducing the oxygen content of the coating to increase the van der Waals attraction binding carbonaceous sheets together, changing the composition of the liquid to reduce wetting (for example, changing the composition of the electrolyte in a battery assembly), and/or connecting the layers using intercalating linking agents that bind parallel sheet surfaces while maintaining the separation between the carbonaceous sheets. Intercalants can include difunctionalized linear molecules (such as diamines), nanoparticles (metal, metal oxide, or polymer), carbon nanotubes, fullerenes, polyaromatic hydrocarbons (PAHs), or similar materials or molecules. Linkages may be through covalent bonding between functionalities on the sheet surfaces and the intercalant, or via 7C-7C stacking of smaller planar molecules (such as PAHs) between the carbonaceous sheets.

FIGS. 4A-D are a series of optical microscopy ("OM") images taken at different times (FIG. 4A=1 second, FIG. 4B=14 seconds, FIG. 4C=24 seconds, and FIG. 4D=54 seconds) after an electric field has been established between two vertically positioned electrodes (not visible). In the images shown, graphene oxide particles in suspension move towards a transparent electrode to the right of each image, an electrically conductive indium tin oxide (ITO) coated silica glass substrate, becoming fixed onto the surface of the electrode, then moving via hydrodynamic forces to form a continuous dense layer. In the example shown, the lateral transport of graphene oxide sheets on the electrode surface is from left to right within the field of view. The film density increases with time, which can be seen as the darker portions on the right side of each image grow in size from FIG. 4A through FIG. 4D.

Figure 5:
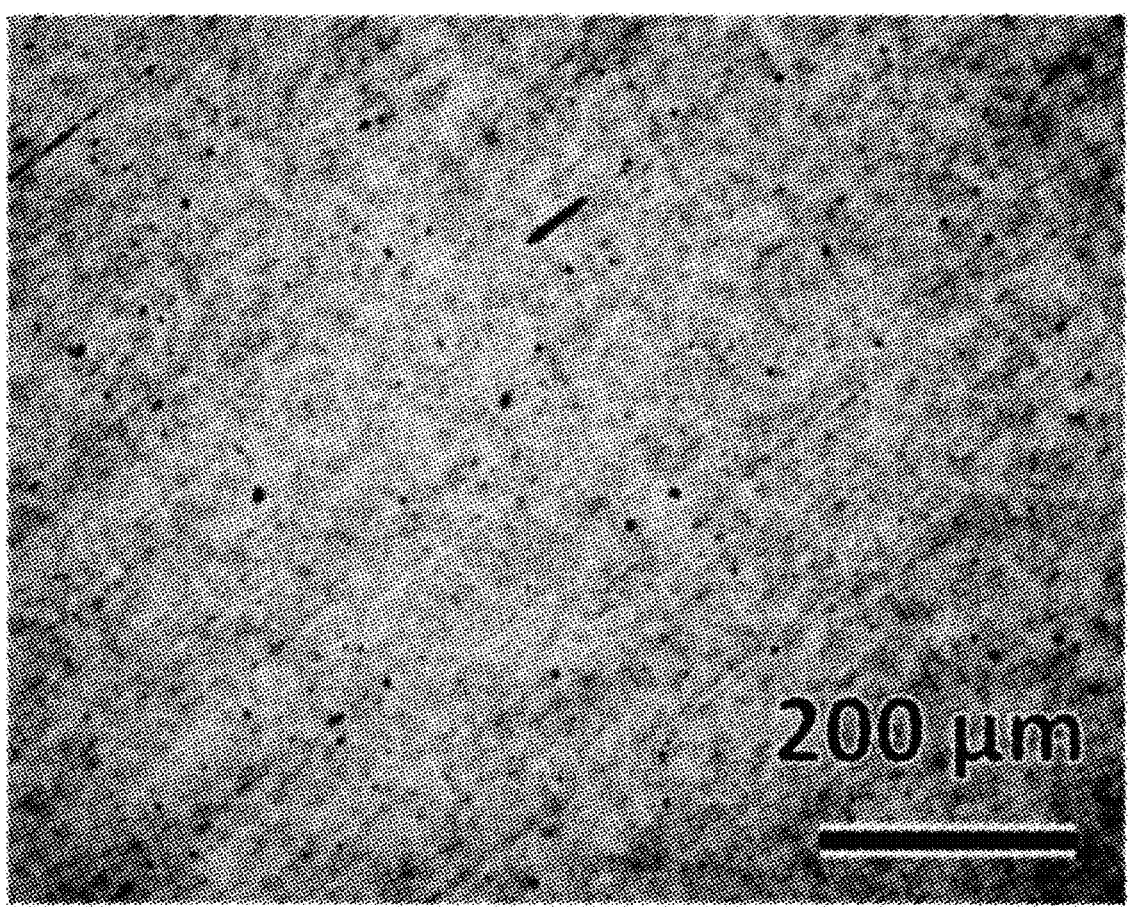
FIG. 5 is an optical microscopy image of carbonaceous material coated on a substrate, in accordance with an embodiment of the present invention.

FIG. 5 is an OM image of a continuous film of carbonaceous material formed on a substrate, in accordance with an embodiment of the present invention. Specifically, FIG. 5 is an OM image of a continuous film of functionalized graphene sheets formed on a Celgard® 2320 microporous trilayer (PP/PE/PP) membrane, a non-conductive polymer film commonly used as an electrode separator in batteries. In the embodiment shown in FIG. 5, the Celgard® 2320 microporous trilayer (PP/PE/PP) membrane layer is 20 micrometers thick and is 39% porous, with average pore diameter of 27 nanometers.

Figure 6:
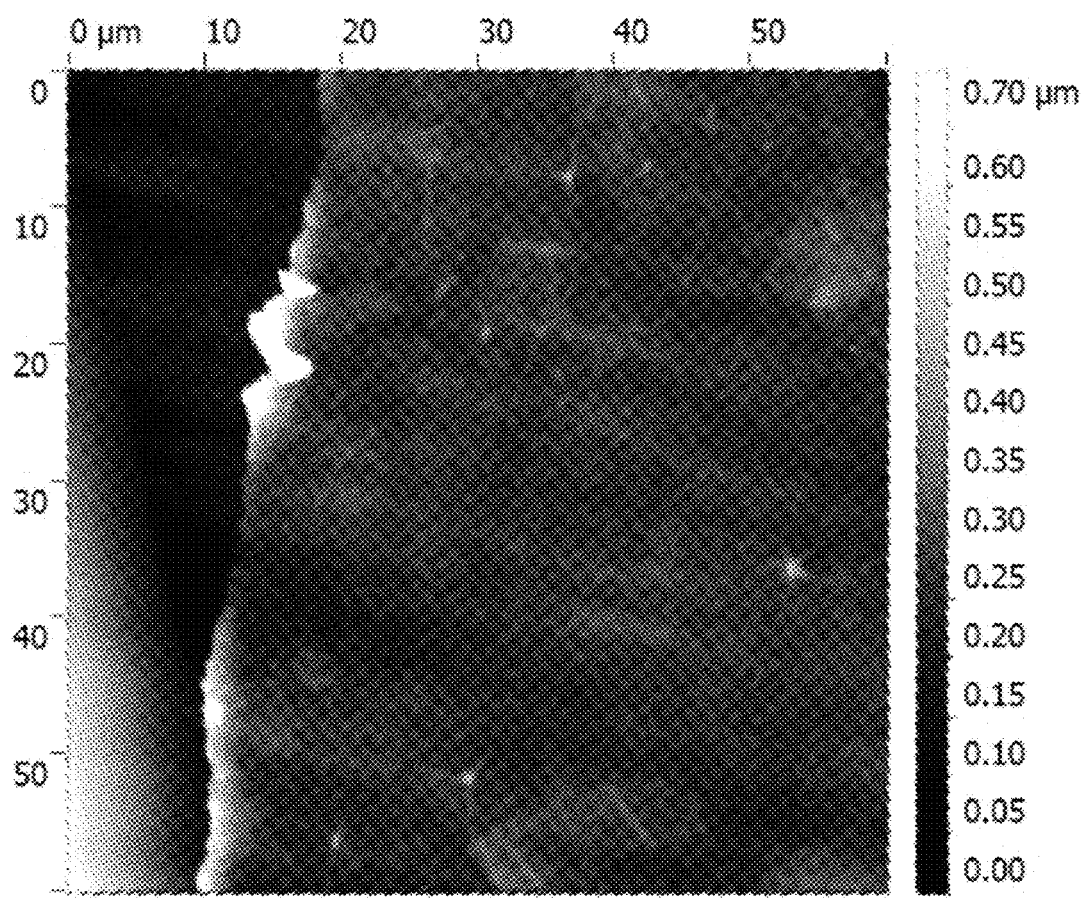
FIG. 6 is an atomic force microscope image the carbonaceous material coated on a substrate, in accordance with an embodiment of the present invention.

FIG. 6 is an atomic force microscopy ("AFM") image of the coated polymer film, in accordance with an embodiment of the present invention. The AFM image reflects that the coating on the polymer film is 100 nm or less.

Figure 7:
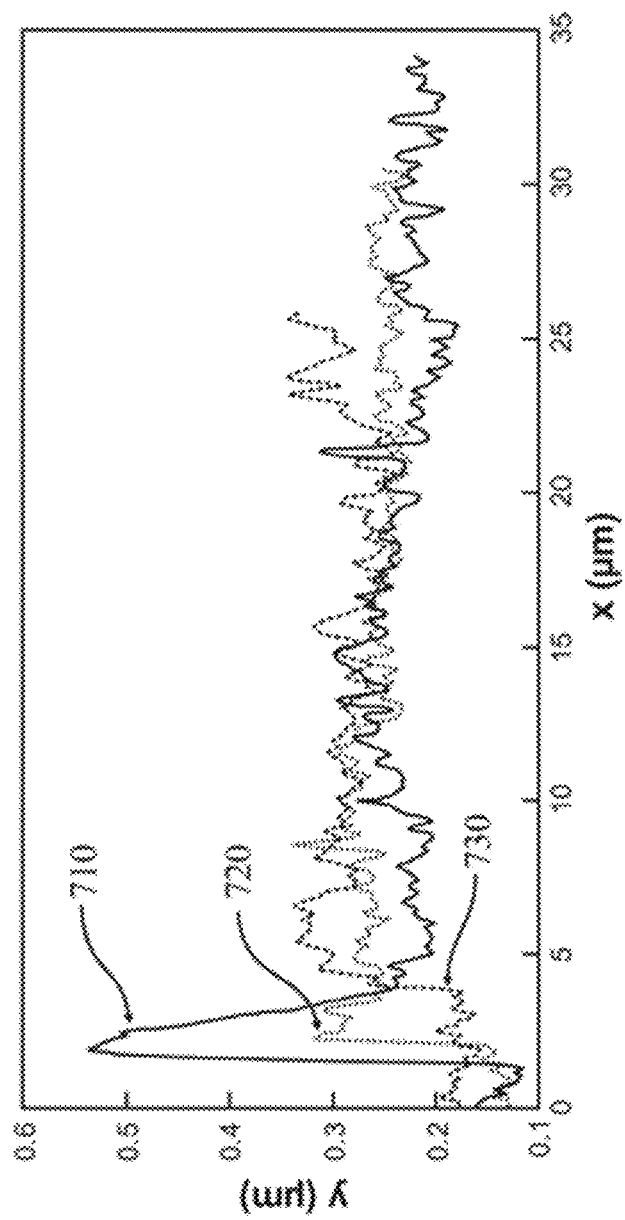
FIG. 7 is a surface profile graph taken from the atomic force microscope image of FIG. 6, in accordance with an embodiment of the present invention.

FIG. 7 illustrates 3 surface profiles (710, 720, 730) of the coating made using the AFM image of FIG. 6 to check surface smoothness and film continuity.

The EHD coatings were tested as barriers to corrosion of lithium metal, an application vital to the development of long-life lithium ion batteries. In the testing procedure, the graphene oxide coated Celgard® 2320 microporous trilayer (PP/PE/PP) membrane is placed on a lithium metal anode, with the graphene oxide membrane in direct contact with the metal. The "protected anode" is assembled into CR2032 type coin cell batteries composed of the anode assemblage, liquid electrolyte (applied to the Celgard® side of the membrane), and capped with a lithium iron phosphate (LFP) cathode. Control batteries were constructed in the same manner, but without the graphene oxide coating on the Celgard® 2320 microporous trilayer (PP/PE/PP) membrane (that is, having an "unprotected anode"). By comparing the electrochemical performance of the batteries containing protected anodes against that of batteries with unprotected anodes, the effectiveness of an EHD membrane as a lithium ion conductor and as a barrier preventing contact between the lithium anode and the corrosive electrolyte were demonstrated.

Figure 8:
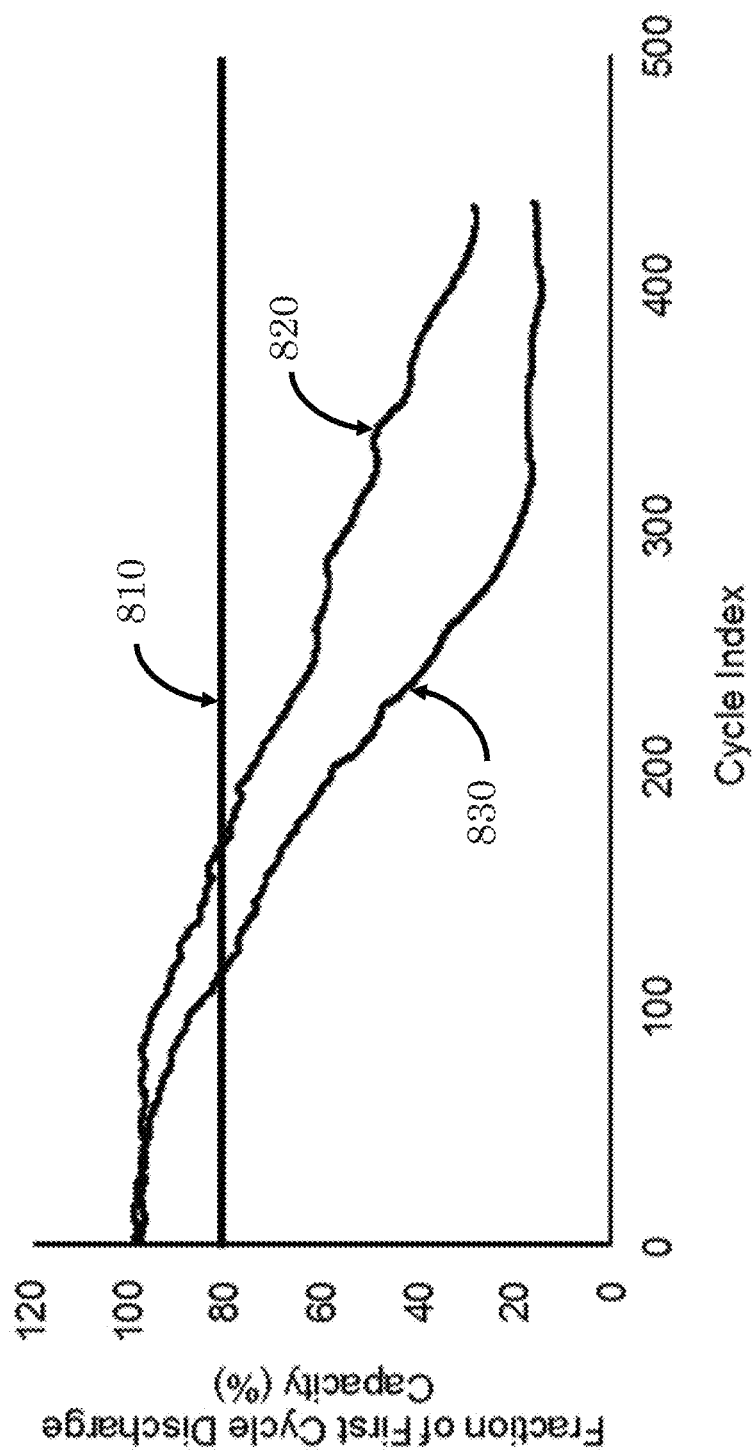
FIG. 8 is a discharge capacity versus cycle index graph, in accordance with an embodiment of the present invention.
Figure 9:
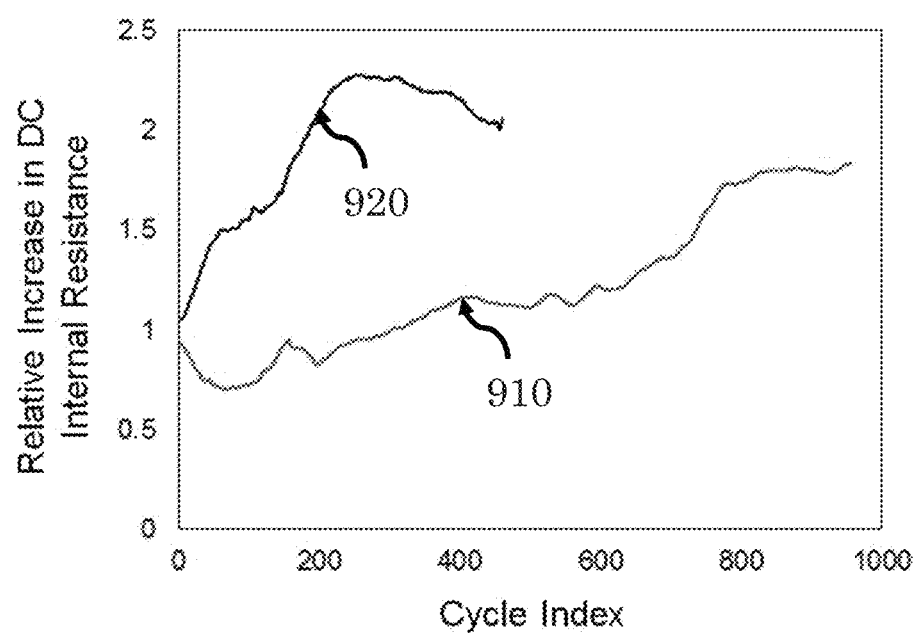
FIG. 9 is an evolution of DC internal resistance graph, in accordance with an embodiment of the present invention.

FIG. 8 depicts a discharge capacity versus cycle index graph, in accordance with an embodiment of the present invention, along with an indication of the 80% discharge capacity (810). A rate of 1.5 mA·cm$^{-2}$ for both charge and discharge was chosen as an appropriate rate for evaluating membrane performance within a suitable timeframe. Under these parameters, the presence of the graphene oxide membrane (820) (the protected anode) increased the number of charge/discharge cycles the battery could withstand by about 75-100 cycles, for cycle life based on 50% initial discharge capacity, over the cycle life of the controls (830) (unprotected anode). The effect at 80% and 90% initial discharge capacity was smaller, although still evident. As shown in FIG. 9, the slower rise in the internal resistance of the batteries containing the graphene oxide membrane (910), with respect to that of the controls (920), indicates that the graphene oxide membrane delays the corrosion of the lithium anode.

Figure 10C:
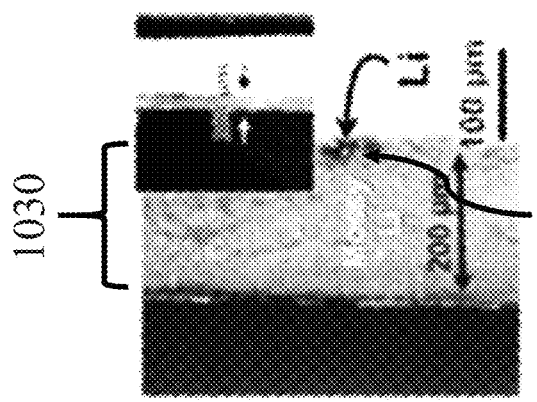
FIGS. 10A-F are cross-sectional scanning electron microscope images of cell cycles of an unprotected lithium electrode, in accordance with an embodiment of the present invention.
Figure 10B:
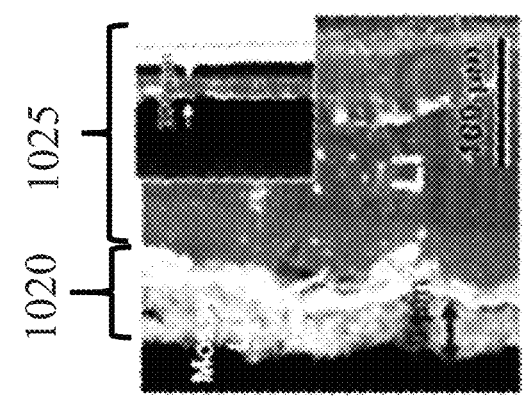
Figure 10A:
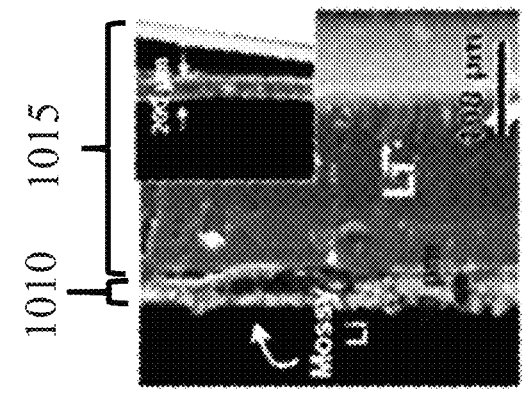

FIGS. 10A, B, C, D, E, and F depict scanning electron microscope ("SEM") images, in accordance with an embodiment of the present invention. Specifically, FIGS. 10A-F illustrates cross-sectional SEM images of cells cycled 5, 25, and 94 times at a rate of 1.5 mA·cm$^{-2}$ for an unprotected lithium electrode (FIG. 10A=5 cycles, FIG. 10B=25 cycles, FIG. 10C=94 cycles), and a lithium electrode protected with an EHD graphene oxide membrane (FIG. 10D=5 cycles, FIG. 10E=25 cycles, FIG. 10F=94 cycles). The presence of the graphene oxide membrane retards the development of the mossy lithium layer, caused by the corrosion of the lithium anode through contact with the electrolyte. The images taken at the membrane/anode interface show that lithium corrosion (1010, 1020, 1030) of the electrode (1015, 1025, 1035) is apparent within the first 5-25 cycles of testing when no graphene oxide membrane is present. After 5 cycles, the thickness of the mossy lithium layer (1010) is approximately 50 μm. Under the high current density used in the tests (1.5 mA·cm$^{-2}$), the thickness of the mossy lithium layer (1020) continues to grow to 60 μm after 25 cycles on the unprotected anodes, and after almost 100 charge/discharge cycles, the mossy lithium layer (1030) is 200 µm.

Figure 10D:
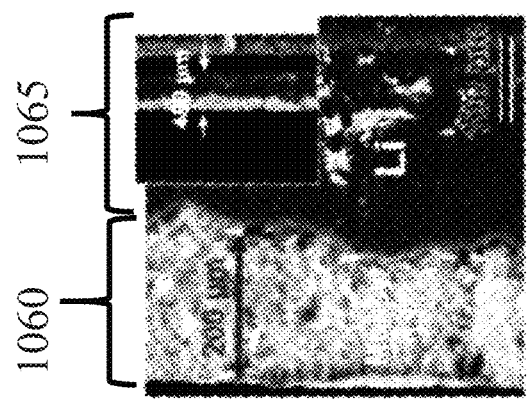
Figure 10E:
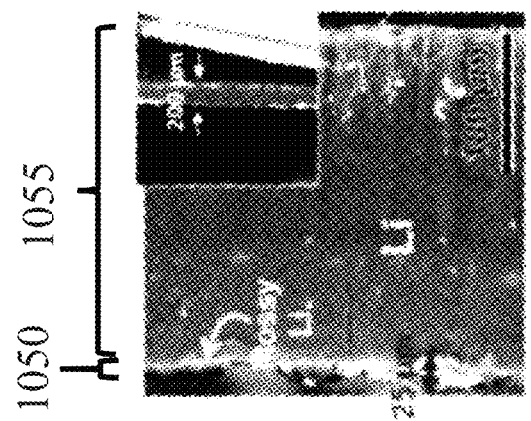
Figure 10F:
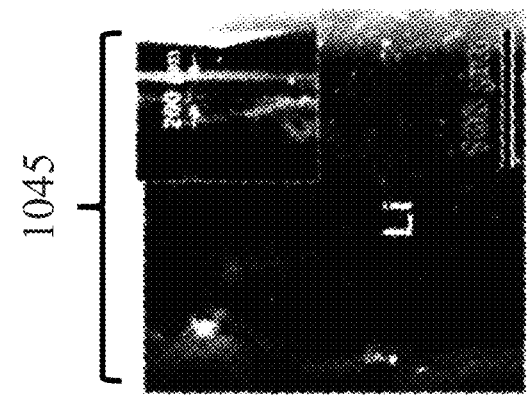

However, when a graphene oxide membrane deposited on the Celgard® 2320 microporous trilayer (PP/PE/PP) is used to protect the anode (protected anode), little or no mossy lithium is visible on the anode (1045) surface after 5 cycles, as seen in FIG. 10D. This indicates that the graphene oxide-coated Celgard® 2320 microporous trilayer (PP/PE/PP) membrane protects the anode from corrosive attack by the electrolyte. FIG. 10E illustrates that after 25 cycles, only patches of mossy lithium (1050), no more than 25 µm thick, are visible on the protected anode (1055). FIG. 10F illustrates that after 94 cycles, the layer of mossy lithium (1060) present between the Celgard® 2320 microporous trilayer (PP/PE/PP) membrane and graphene oxide membrane is roughly equivalent to that observed on the unprotected anode. The increase in the lifetime of the batteries (by about 75 to 100 cycles) is due to the initial gains from protecting the lithium anode using a graphene oxide membrane deposited on Celgard® 2320 microporous trilayer (PP/PE/PP). Battery life is extended in the protected anode samples by this delay in the growth of the mossy lithium layer on the protected anode.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:

1. A method for electrohydrodynamic deposition of at least one carbonaceous material, comprising the steps of:
   a. providing an electrohydrodynamic cell comprising two electrodes positioned in a parallel orientation and separated by a defined space or gap, where each electrode is comprised of a conductive material having an outer surface;
   b. providing materials for a solid phase, comprising the at least one carbonaceous material;
   c. providing materials for a suspension medium, comprising at least one of an organic liquid, water, ionic liquids, mixtures or solutions of organic liquids or water, and liquid phases of organic solids with melting temperatures higher than the standard room temperature, which act as solvent or the suspension medium;
   d. forming a liquid-based suspension by combining the materials for the solid phase and the materials for the suspension medium, and agitating;
   e. placing the liquid-based suspension between the electrodes;
   f. applying an electrical field having a first direction between the electrodes to cause deposition on the electrode having a charge opposite that of the suspended material to be deposited;
   g. varying the intensity of the electric field sufficiently to drive lateral movement of sheets, stacks, or mixtures of the same to form edge-to-edge aggregates;
   h. continue the process of deposition and the lateral movement to build up layers comprising of the sheets, stacks, or mixtures of the same to reach a targeted thickness;
   i. increasing the electrical field to stop the lateral movement and fix the layers in place, forming a permanent layered structure;
   j. reducing the applied field to zero; and
   k. removing the electrodes from the electrohydrodynamic cell.

2. The method of claim 1, wherein at least one of the electrodes further comprises a substrate in contact with or electrical communication with the outer surface of the conductive material.

3. The method of claim 1, wherein the electrodes are positioned either parallel or perpendicular to a base surface of the electrohydrodynamic cell.

4. The method of claim 1, wherein the spacing between the electrodes can be varied, from a minimum spacing defined by the smallest separation that allows a sufficient volume of suspension between the electrodes to enable deposition to a maximum spacing defined by the greatest separation to which a field may be applied that can maintain deposition.

5. The method of claim 1, wherein an ionic concentration or pH of the liquid-based suspension is adjusted by changing concentration of the dispersed material or adding at least one additional substance.

6. The method of claim 5, wherein the at least one additional substance is selected from the group consisting of an ionic salt, acid, base, and ionic liquid.

7. The method of claim 1, wherein a concentration of the solid phase in the liquid-based suspension is greater than 0.1 mg/mL.

8. The method of claim 1, wherein the intensity of the applied electrical field is greater than 0 volts and less than 1,000 volts.

9. The method of claim 1, wherein the intensity of the applied electrical field is varied during deposition.

10. The method of claim 1, wherein the temperature of the liquid-based suspension is raised or lowered during deposition.

11. The method of claim 1, wherein a thickness of the layered structure is controlled by adjusting at least one of: the concentration of the solid in the suspension, the intensity of the applied voltage, the duration of the applied voltage, and the distance between the electrodes.

12. The method of claim 1, wherein the field intensity is varied during deposition to create graded structures in which the spacing and/or areal density of the layered aggregates changes through the thickness of the deposited layer.

13. The method of claim 1 wherein the solid phase is a mixture of the at least one carbonaceous material and at least one other material for deposition.

14. The method of claim 13, further comprising the steps of:
   a. after varying the intensity of the electric field to form the edge-to-edge aggregates, reversing the field direction such that deposition of materials having an overall charge opposite that of the carbonaceous materials occurs onto the previously deposited layer; and
   b. repeating the process of reversing field directions and depositing alternating layers of materials until the desired composite layered structure has been produced.

15. The method of claim 1, further comprising the steps of:
   a. removing at least one of the electrodes from the electrohydrodynamic cell and placing the at least one of the electrodes into a second electrohydrodynamic cell containing a suspension comprising a different carbonaceous material; and b. repeating the process of electrohydrodynamic deposition to put a second layer composed of the different material onto the at least one of the electrodes or electrode/substrate combinations.

16. The method of claim 15, wherein removing the at least one of the electrodes comprises removing two electrodes.

17. The method of claim 15, wherein the second electrohydrodynamic cell contains a suspension of a non-carbonaceous material that is deposited onto the previously deposited coatings through electrophoretic or electrohydrodynamic deposition.

18. The method of claim 15, further comprising repeatedly cycling the at least one of the electrodes between two or more different suspensions or solutions and depositing layers each cycle to create a thicker graded coating, a composite coating, or both.

19. The method of claim 1, wherein the at least one of the electrodes is covered by a first material prior to electrohydrodynamic deposition, wherein the first material is comprised of a conductive, insulating, or semiconducting material or composites thereof, and wherein the first material is selected so as to be impermeable to atoms, molecules, ions, oligomers, and polymers; or to have an intrinsic porosity in which the average channel diameter, accessibility, tortuosity, and length is selected to facilitate the passage of targeted agents such as atoms, molecules, ions, oligomers, and polymers.

20. The method of claim 1, further comprising the steps of:
　a. providing at least one of the electrodes having a length greater than that of the electrohydrodynamic cell;
　b. submerging at least a portion of the at least one of the electrodes in the liquid-based suspension; and
　c. moving the at least of the one electrodes through the liquid-based suspension, relative to the opposing electrode, at a fixed velocity and separation distance;
　d. wherein the submerged portion is located within the electrohydrodynamic cell such that at least a portion of the submerged portion will be exposed to the suspension under the influence of the applied field.

21. The method of claim 1, further comprising the step of removing the layered structure from at least one of the electrodes.

22. The method of claim 21, wherein the at least one of the electrodes may be dense or have an intrinsic porosity such that it may be completely or partially filled by the suspended materials in order to create a dense or a porous coating on the at least one of the electrodes.

23. The methods of claim 21, further comprising drying the structure to remove remaining liquid through the application of heat and/or flowing gas or vapor or left at ambient temperature ("air-dried").

24. The method of claim 23, wherein drying is accompanied by the thermal reduction of the carbonaceous materials through the removal of oxygen atoms by the formation of water vapor, molecular oxygen, and/or carbon oxides.

25. The method of claim 21, further comprising exposing the layered structure to melts, liquids, vapors, or gases for the reduction of the carbonaceous material and/or the physical intercalation of the layered structure.

26. The method of claim 21, further comprising exposing the layered structure to electromagnetic radiation.

27. The method of claim 1, wherein varying the intensity of the electric field also drives lateral movement of graphitic particles when forming edge-to-edge aggregates.

* * * * *